US007591125B2

(12) United States Patent
Horsey

(10) Patent No.: US 7,591,125 B2
(45) Date of Patent: Sep. 22, 2009

(54) APPARATUS AND METHOD FOR CINCHING A SADDLE

(75) Inventor: Herbert R. Horsey, Blanchard, OK (US)

(73) Assignee: The Original Cinch Hook, Inc., Blanchard, OK (US)

( * ) Notice: Subject to any disclaimer, the term of this patent is extended or adjusted under 35 U.S.C. 154(b) by 481 days.

(21) Appl. No.: 11/267,054

(22) Filed: Nov. 4, 2005

(65) Prior Publication Data

US 2006/0130440 A1 Jun. 22, 2006

Related U.S. Application Data

(60) Provisional application No. 60/593,183, filed on Dec. 17, 2004.

(51) Int. Cl.
*B64C 1/14* (2006.01)

(52) U.S. Cl. .................................. 54/23; 54/35; 24/182

(58) Field of Classification Search ....................... 54/4, 54/23, 35, 46.1; 24/182
See application file for complete search history.

(56) References Cited

U.S. PATENT DOCUMENTS

| | | | | |
|---|---|---|---|---|
| 262,053 | A | 8/1882 | King | |
| 701,836 | A * | 6/1902 | Bush | 54/23 |
| 1,130,049 | A | 3/1915 | Welches | |
| 1,503,715 | A | 8/1924 | Schnitger | |
| 2,519,857 | A * | 8/1950 | Smith | 54/46.1 |
| 4,821,380 | A | 4/1989 | Crosby | |
| 5,029,434 | A | 7/1991 | Erickson | |
| 5,226,282 | A | 7/1993 | Meyers | |
| 5,685,133 | A | 11/1997 | Travis | |
| 5,802,822 | A | 9/1998 | Holzhauser | |
| 6,164,048 | A | 12/2000 | Rhodes | |
| 6,378,278 | B1 | 4/2002 | Talbot | |
| 6,530,128 | B2 | 3/2003 | Bunjes et al. | |
| 6,688,086 | B2 | 2/2004 | Foerderer | |
| 6,761,019 | B2 * | 7/2004 | Earnhart | 54/23 |
| 2003/0000183 | A1 | 1/2003 | Foerderer | |

FOREIGN PATENT DOCUMENTS

| | | | |
|---|---|---|---|
| EP | 0 860 397 | A1 | 8/1998 |
| EP | 0 974 549 | A1 | 1/2000 |
| WO | WO 03/020632 | A3 | 3/2003 |

* cited by examiner

*Primary Examiner*—Rob Swiatek
(74) *Attorney, Agent, or Firm*—Dunlap Codding, P.C.

(57) ABSTRACT

A cinch connector for connecting a cinch to a saddle. The cinch connector has a frame, a latch bar, and a tongue. The frame has a top frame member, a bottom frame member, and an intermediate frame member supported in a spaced apart, parallel relation to define a first strap receiving slot and a second strap receiving slot. The latch bar is pivotally connected to the bottom frame member and defines a catch receiving space. At least a portion of the latch bar is configured to be received through the ring of a buckle when the distal end of a catch of the buckle is disengaged from the ring so that the catch of the buckle may then be rotated through the catch receiving space of the latch bar to engage the ring of the buckle thereby capturing the latch bar to connect the cinch connector to the buckle. The tongue is pivotally connected to the bottom frame member and extendible to the intermediate frame member to fasten the strap to the cinch connector.

11 Claims, 5 Drawing Sheets

APPARATUS AND METHOD FOR CINCHING A SADDLE

CROSS REFERENCE TO RELATED APPLICATIONS

This application claims benefit of U.S. Provisional Application No. 60/593,183, filed Dec. 17, 2004, which is incorporated herein by reference in its entirety.

BACKGROUND OF THE INVENTION

1. Field of the Invention

The present invention relates generally to saddlery, and more particularly, but not by way of limitation, to an apparatus and method for cinching a saddle to an animal, 2. Brief Description of Related Art Most saddles are secured on an animal by means of a cinch or girth strap which is connected to both sides of the saddle and passes beneath the body of the animal. The cinch is typically connected to each side of the saddle with a flexible strap. On one side of the saddle, a strap is passed through an opening or ring provided in the saddle and through a buckle provided on one end of the cinch. Similarly, on the other side of the saddle, a second strap is passed through an opening or ring provided in the saddle and through a buckle provided on the opposite end of the cinch. The second strap is often referred to as a latigo.

The straps connecting the cinch to the saddle are looped one or more times through the buckle and through the opening in the saddle before securing the strap in an adjusted position by either a tongue on the buckle or by looping the strap about itself before being terminated in a locking loop. In those cinches having a buckle through which the strap makes several loops, it requires considerable pulling pressure to tighten the cinch about the animal due to the leather strap being looped upon itself resulting in a leather-to-leather sliding contact with the resultant large friction force occurring therebetween. Attempts have been made to solve this problem by providing a cinch buckle provided with rollers to reduce the frictional forces, thereby facilitating the process of cinching the saddle to the horse.

Such buckles also facilitate the removal of the straps from the buckle when one desires to remove the saddle from the horse. However, such buckles still require that the strap be un-looped from the buckle completely before the saddle may be removed from the animal. Such task is tedious and time consuming. Moreover, the strap must be re-looped through the buckle when placing the saddle back on a animal.

To overcome this problem, a cinch strap providing a quick disconnect has been suggested and disclosed in U.S. Pat. No. 1,503,715 issued to Schnitger. The Schnitger device includes a connecting buckle with a hook portion that is connectable to a buckle of the cinch strap. The buckle of the cinch strap is modified however so as not to have a catch member. The latigo is looped through the slots provided on the connecting buckle. The connecting buckle may be quickly released from the cinch strap without requiring the latigo from having to be un-looped completely from the connecting buckle. Nevertheless, the Schnitger device does have its drawbacks in that modification of a conventional cinch buckle in the form of removing the catch member and/or grinding the buckle so that it may receive the hook of the connecting buckle is required prior to using the Schnitger device. Therefore, a need exists for an improved cinch connector that permits quick and easy attachment and detachment of a saddle while requiring no modification of a conventional cinch. It is to such an apparatus and method that the present invention is directed.

BRIEF DESCRIPTION OF THE SEVERAL VIEW OF THE DRAWINGS

DETAILED DESCRIPTION OF THE INVENTION

Figure 1:
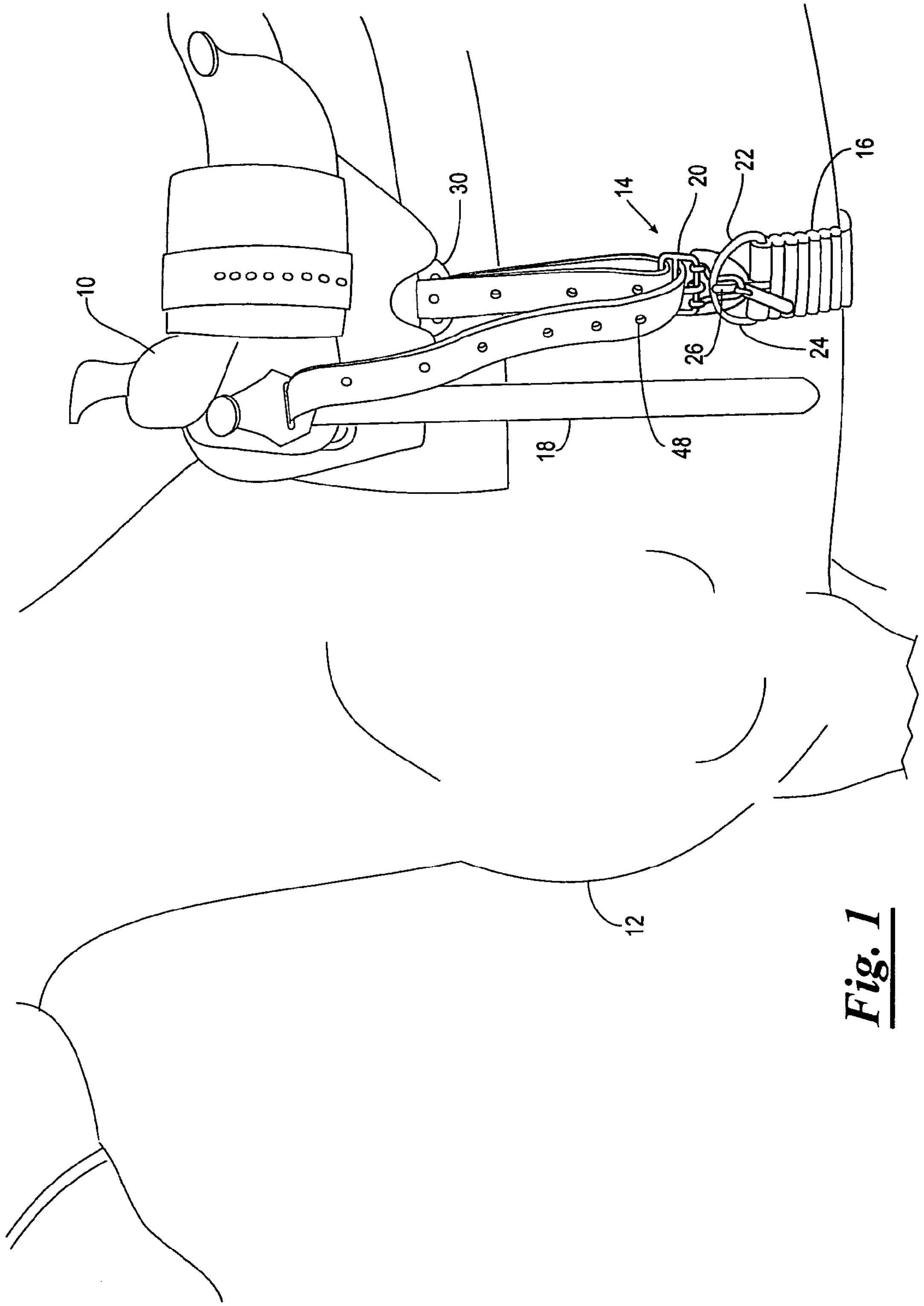
FIG. 1 is a perspective view of a saddle having a cinch employing a cinch connector constructed in accordance with the present invention.

Referring now to the drawings, and more particularly to FIG. 1, a saddle 10 is shown mounted on a horse 12 and secured to the horse 12 with a cinch assembly 14 constructed in accordance with the present invention. The saddle 10 depicted in FIG. 1 is commonly known as a western style saddle. However, it should be understood that the cinch assembly 14 of the present invention is applicable to other types of saddles and need not be limited to western style saddles.

The cinch assembly 14 includes a cinch or girth 16, a pair of straps 18 (only one of the straps 18 depicted in FIG. 1), and a cinch connector 20. The cinch 16 is a strap typically formed of a soft material and which passes along the underbelly of the horse 12. The cinch 16 is provided with a buckle 22 on each end thereof (only one of the buckles 22 being depicted in FIG. 1). The buckles 22 include a ring 24 and a catch 26 that is pivotally connected to the ring 24. The cinch 16 is adjustably connected to the saddle 10 with the straps 18 and the cinch connector 20. The straps 18 are flexible straps which are attached to each side of the saddle 10. The straps 18 may be either permanently attached to the saddle 10 or looped through a ring 30 provided on each side of the saddle 10. The cinch connector 20 functions as a "quick connect" between the buckle 22 of the cinch 16 and the strap 18. The cinch connector 20 may be used on one or both ends of the cinch 16.

Figure 2:
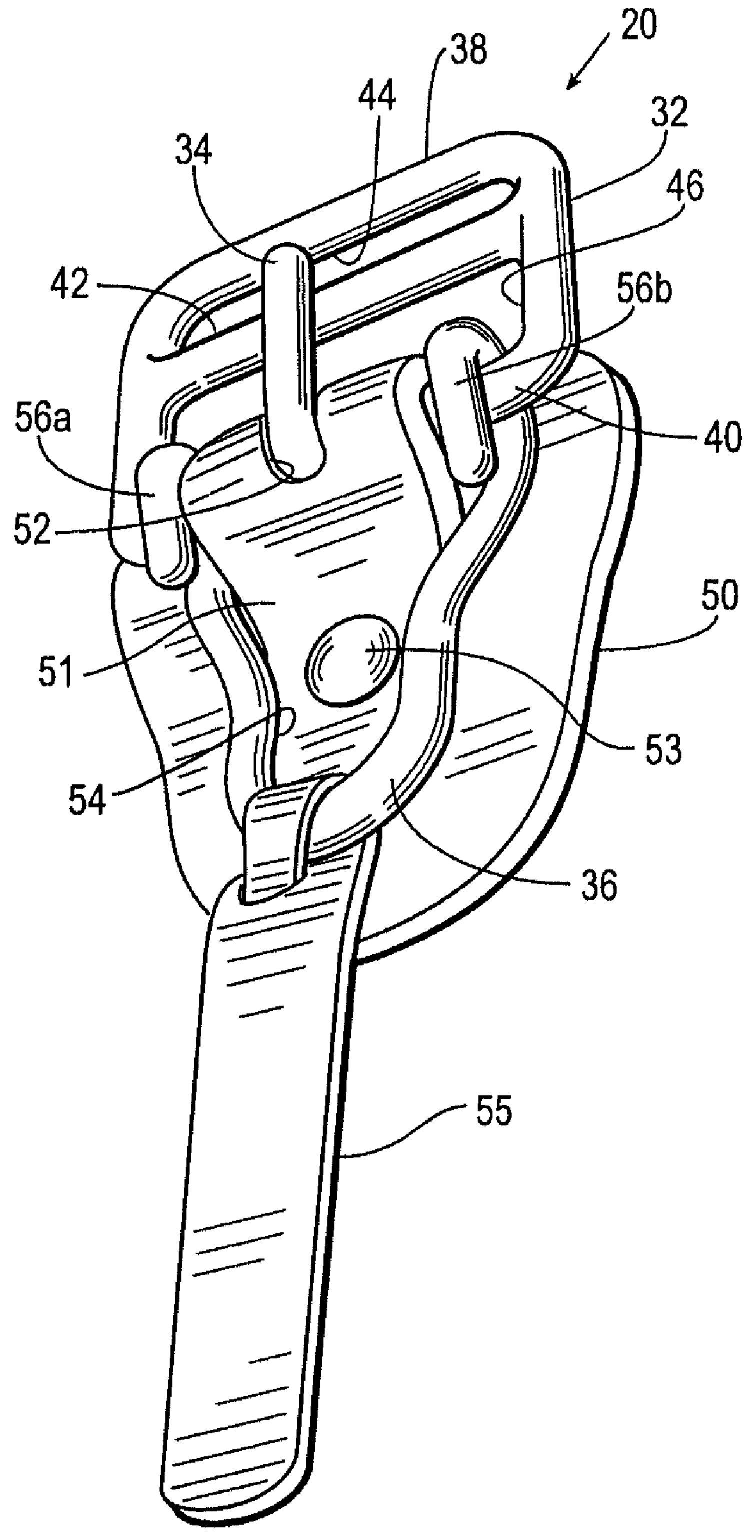
FIG. 2 is a perspective view of the cinch connector of the present invention.
Figure 3:
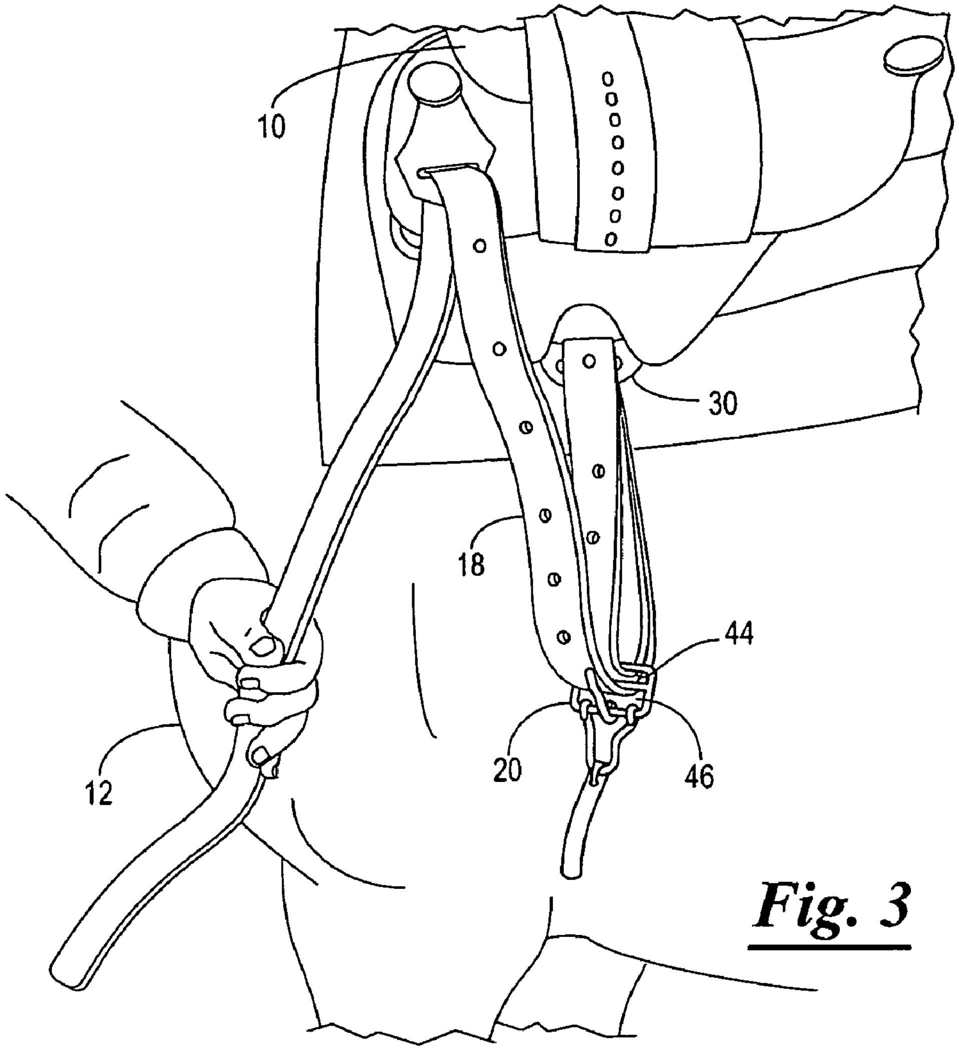
FIG. 3 is an diagrammatic view showing a strap looped between the saddle and the cinch connector.

Referring now to FIG. 2, the cinch connector 20 includes a frame 32, a tongue 34, and a latch bar 36. The frame 32 has a top frame member 38, a bottom frame member 40, and an intermediate frame member 42 supported in a spaced apart, parallel relation to define a first strap receiving slot 44 and a second strap receiving slot 46. The first strap receiving slot 44 and the second strap receiving slot 46 permit the strap 18 to be looped twice through the frame 32 and reduce the frictional engagement between the strap 18 resulting from looping the strap 18 upon itself. The friction may further be reduced by providing rollers (not shown) on the top frame member 38 and the intermediate frame member 40. In contrast, it should also be appreciated that the frame 32 may be constructed to form only one strap receiving slot.

The tongue 34 is pivotally connected to the bottom frame member 40 and extends to the intermediate frame member 42 so that the tongue 34 may be inserted through a hole 48 (FIG. 1) in the strap 18 to fasten the strap 18 to the cinch connector 20. In an instance when the frame 32 is formed to have only one strap receiving slot, it will be appreciated that the tongue 34 would extend to the upper most frame member. The tongue 34 is supported in a centralized location along the bottom frame member 40 with a leather shield 50. More specifically, the shield 50 is has a flap 51 provided with a tongue receiving slot 52. The flap 51 is looped around the bottom frame member 40 and secured to the shield 50 with a fastener, such as a rivet 53, with the tongue 34 inserted through the tongue receiving slot 52. In another version where the shield 50 is not employed, the tongue 34 may be supported in a centralized location along the bottom frame member 40 with a pair of stop members formed or positioned on the bottom frame member 40.

The latch bar 36 is connected to the bottom frame member 40 and defines a catch receiving space 54. The latch bar 36 is formed of a rigid material and is configured so that at least a portion of the latch bar 36 may be received through the ring 24 of the buckle 22 of the cinch 16 when the distal end of the catch 26 of the buckle 22 is disengaged from the ring 24 so that the catch 26 may then be rotated through the catch receiving space 54 of the latch bar 36 to engage the ring 24 of the buckle 22 thereby capturing the latch bar 36 to connect the cinch connector 20 to the buckle 22. More specifically, the latch bar 36 is a substantially tapered, U-shaped member with upper ends 56*a* and 56*b* connected to the bottom frame member 40 on each side of the tongue 34. The latch bar 36 is preferably pivotally connected to the bottom frame member 40 to facilitate moving the catch 26 of the buckle 22 through the catch receiving space 54 of the latch bar 36. However, it will be appreciated by those skilled in the art that the latch bar 36 may be fixed to the frame so long as sufficient slack is provided in the strap 18 when connecting and disconnecting the latch bar 36 from the buckle. It should be further appreciated that the latch bar 36 may be formed in any shape, such as V-shaped, so long as the latch bar 36 is cable of passing sufficiently through the ring 24 of the buckle 22 so that the catch 26 of the buckle 22 may pass under the latch bar 36 and through the catch receiving space 54 of the latch bar 36 to engage the ring 24 of the buckle 22. A strap 55 may be attached to the latch bar 36 to facilitate unlatching of the latch bar 36 in a manner to be discussed below.

Figure 8:
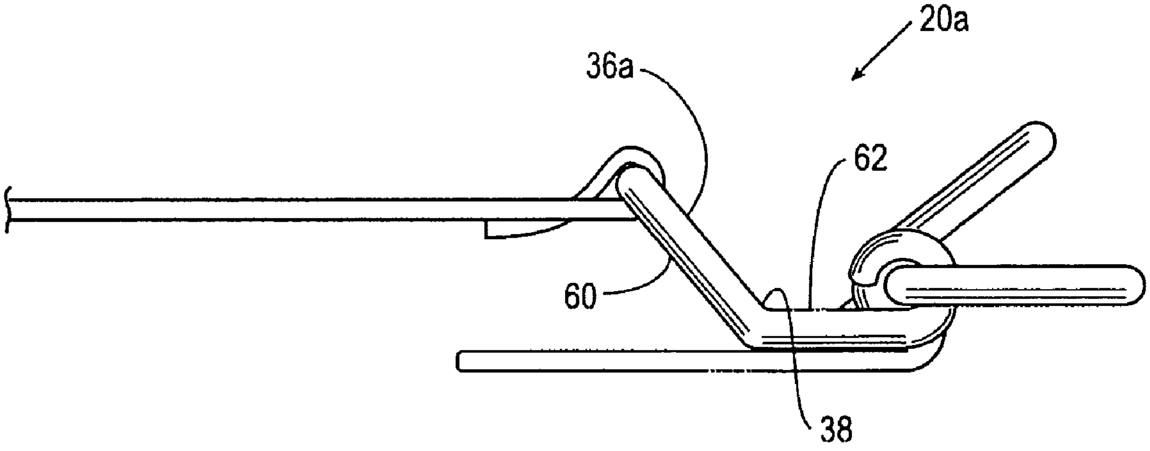
FIG. 8 is a side elevational view of another embodiment of a cinch connector constructed in accordance with the present invention shown with the shield removed for the sake of clarity.

FIG. 8 shows another embodiment of a cinch connector 20*a* with the shield 50 removed for the sake of clarity. The cinch connector 20*a* is similar to the cinch connector 20, except the cinch connector 20*a* has a latch bar 36*a* provided with a bend 58 so that a first plane defined by a distal portion 60 of the latch bar 36*a* is angled with respect to a second plane defined by a proximal portion 62 of the latch bar 36*a*. The angled relationship between the distal portion 60 and the proximal portion 62 permits the frame 32*a*, the proximal portion 62 of the latch bar 36*a*, and the buckle 22 of the cinch 16 to lay flatter against the body of the animal than with the use of the cinch connector 20. While the distal portion 60 may be angled with respect to the proximal portion 62 at any angle, a preferred angle is in a range of from about 30 degrees to about 60 degrees.

Referring now to FIGS. 3-7, the method of securing the saddle 10 to an animal, such as the horse 12, using the cinch connector 20 will be described. It should be noted that for the sake of clarity, the cinch connector 20 is depicted in FIGS. 3-7 with the shield 50 removed. With the far side of the cinch 16 connected to the saddle 10 in a conventional manner, the cinch connector 20 is connected to the near side of the saddle using the strap 18. More specifically, as shown if FIG. 3, the strap 18, having been secured to the ring 30, is threaded through the first strap receiving slot 44 of the cinch connector 20, pulled upwardly and threaded again through the ring 30 of the saddle 10, and pulled back down to the cinch connector 20 where the strap 18 is threaded through the second strap receiving slot 46. It will be appreciated that the step of looping the strap 18 through the cinch connector 20 need not be repeated again unless it is desired to remove the cinch connector 20 from the strap 18.

Figure 4:
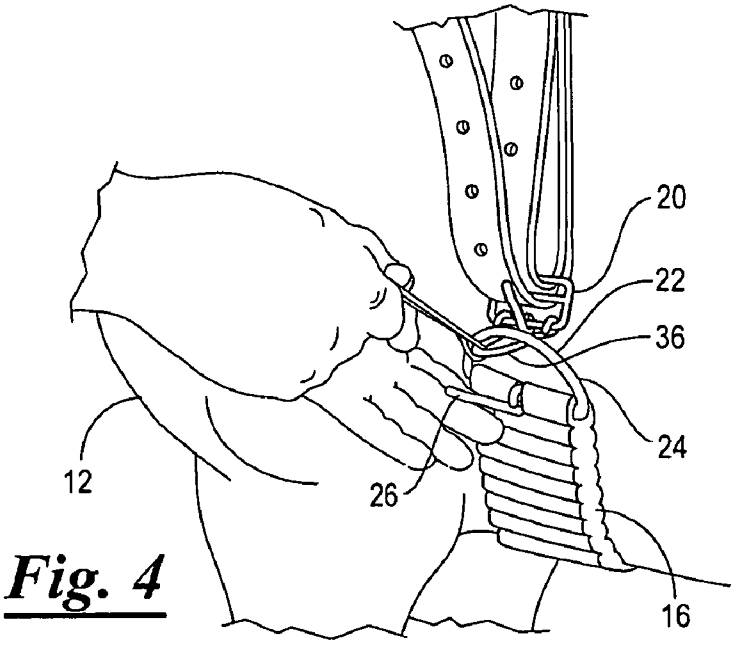
FIG. 4 is a diagrammatic view showing a latch bar of the cinch connector inserted in a buckle of the cinch.
Figure 5:
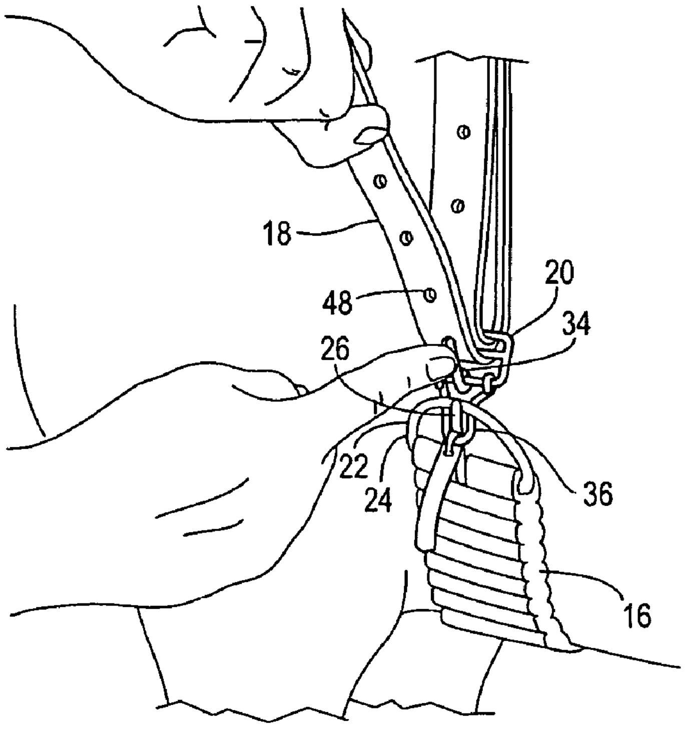
FIG. 5 is a diagrammatic view showing a tongue of the cinch connector being inserted into a hole of the strap.
Figure 6:
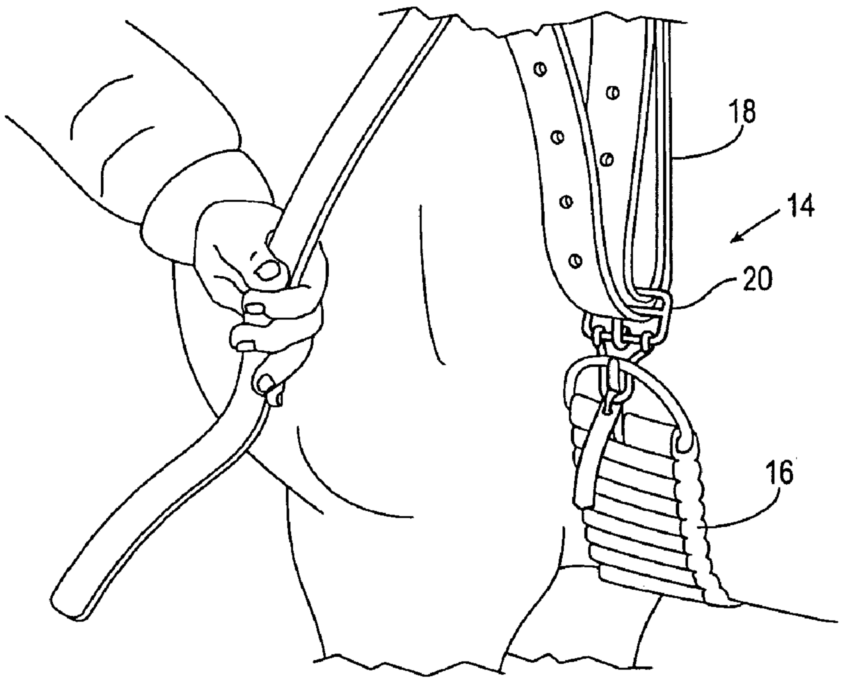
FIG. 6 is a diagrammatic view showing the cinch connected to the strap with the cinch connector.

As shown in FIG. 4, the cinch 16 is then passed beneath the body of the horse 12, and the latch bar 36 is inserted through the ring 24 of the buckle 22 to cause a distal end of the catch 26 to disengage from the ring 24 of the buckle 22. The catch 26 of the buckle 22 is then rotated up through the catch receiving space 54 of the latch bar 36 (FIG. 4) to engage the ring 24 of the buckle 22 thereby capturing the latch bar 36 (FIG. 5). The strap 18 is next pulled to the desired tension. When the desired tension has been obtained, the tongue 34 is inserted through a selected hole of the strap 18 (FIG. 5). With the strap 18 secured relative to the cinch connector 20, the cinch assembly 14 is assembled, as shown in FIGS. 1 and 6. It will be appreciated that the free end the strap 18 could be looped through the ring 30 and tied off in a locking loop eliminating the need for the tongue 34 without affecting the concept of the invention or preferred manner of use of the cinch connector 20.

Figure 7:
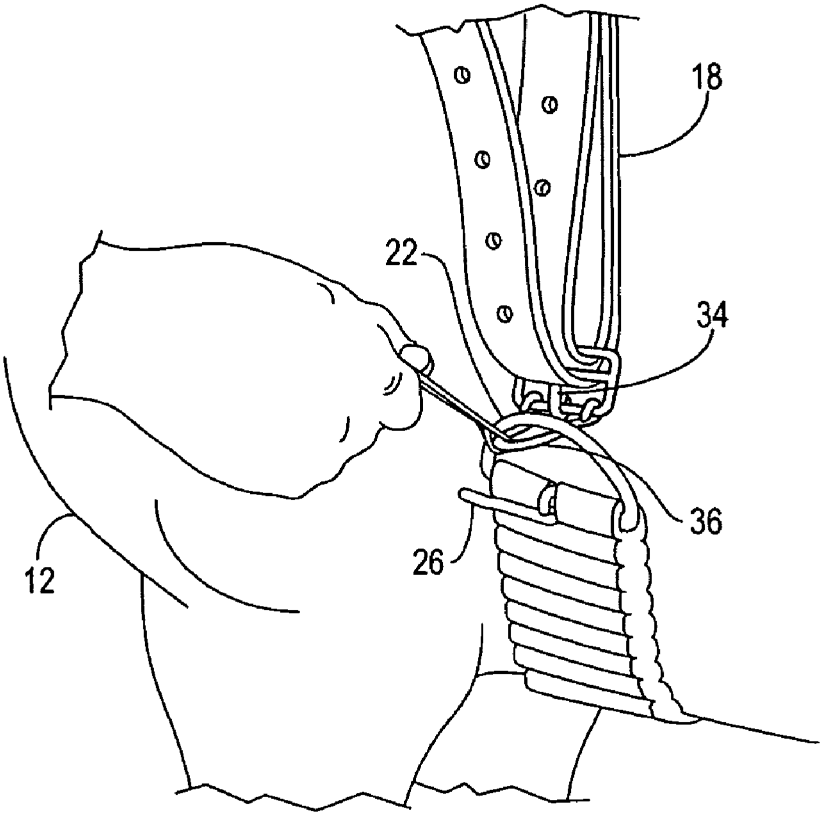
FIG. 7 is a diagrammatic view showing the latch bar of the cinch connector being removed from the buckle of the cinch.

With reference to FIG. 7, to remove the saddle 10 from the horse 12, the tongue 34 is first removed from the hole of the strap 18. Next, the latch bar 36 is pulled upwardly to allow the catch 26 of the buckle 22 to be rotated down through the catch receiving space 54 thereby releasing the latch bar 36. With the latch bar 36 released, the saddle 10 may be removed from the horse 12.

To re-saddle the horse 12, the latch bar 36 is simply secured to the buckle 22 as previously described without requiring the strap 18 to be re-looped through the first strap receiving slot 44 and the second strap receiving slot 46. After the latch bar 36 is secured to the buckle 22, the strap 18 is tightened and fastened with the tongue 34.

From the above description, it is clear that the present invention is well adapted to carry out the objects and to attain the advantages mentioned herein, as well as those inherent in the invention. While a presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A cinch assembly for securing a saddle to an animal, comprising:

a cinch having one end connectable to one side of the saddle and another end having a buckle including a ring and a catch;

a strap extendible from the saddle; and a cinch connector detachably connecting the buckle of the cinch to the strap, the cinch connector comprising:

a frame defining a strap receiving slot;

a rigid latch bar connected to the frame member and defining a catch receiving space, at least a portion of the latch bar configured to be received through the ring of the buckle when the distal end of the catch of the buckle is disengaged from the ring so that the catch of the buckle may then be rotated through the catch receiving space of the latch bar to engage the ring of the buckle thereby capturing the latch bar to connect the cinch connector to the buckle; and a tongue pivotally connected to the frame and extendible through a hole in the strap to fasten the strap to the cinch connector.

2. The cinch assembly of claim 1 wherein the latch bar is substantially U-shaped.

3. The cinch assembly of claim 1 wherein the latch bar has a distal portion defining a first plane and a proximal portion defining a second plane and wherein the first plane is angled with respect to the second plane.

4. A cinch assembly for securing a saddle to an animal, comprising:

a cinch having one end connectable to one side of the saddle and another end having a buckle including a ring and a catch:

a strap extendible from the saddle; and a cinch connector detachably connecting the buckle of the cinch to the strap, the cinch connector comprising:

a frame defining a strap receiving slot; and a rigid latch bar connected to the frame member and defining a catch receiving space, at least a portion of the latch bar configured to be received through the ring of the buckle when the distal end of the catch of the buckle is disengaged from the ring so that the catch of the buckle may then be rotated through the catch receiving space of the latch bar to engage the ring of the buckle thereby capturing the latch bar to connect the cinch connector to the buckle, wherein the latch bar is pivotally connected to the frame.

5. A cinch assembly for securing a saddle to an animal, comprising:

a cinch having one end connectable to one side of the saddle and another end having a buckle including a ring and a catch;

a strap extendible from the saddle; and a cinch connector detachably connecting the buckle of the cinch to the strap. the cinch connector comprising:

a frame defining a strap receiving slot; and a rigid latch bar connected to the frame member and defining a catch receiving space, at least a portion of the latch bar configured to be received through the ring of the buckle when the distal end of the catch of the buckle is disengaged from the ring so that the catch of the buckle may then be rotated through the catch receiving space of the latch bar to engage the ring of the buckle thereby capturing the latch bar to connect the cinch connector to the buckle, wherein the frame of the cinch connector has a top frame member, a bottom frame member, and an intermediate frame member supported in a spaced apart, parallel relationship to one another to define a first strap receiving slot and a second strap receiving slot.

6. The cinch assembly of claim 5 wherein the cinch connector further comprises a tongue pivotally connected to the bottom frame member and extendible to the intermediate frame member.

7. A cinch assembly for securing a saddle to an animal, comprising:

a cinch having one end connectable to one side of the saddle and another end having a buckle, the buckle including a ring and a catch;

a strap extendible from the saddle; and a cinch connector detachably connecting the buckle of the cinch to the strap, the cinch connector comprising:

a frame having a top frame member, a bottom frame member, and an intermediate frame member supported in a spaced apart, parallel relation to define a first strap receiving slot and a second strap receiving slot;

a rigid latch bar pivotally connected to the bottom frame member and defining a catch receiving space, at least a portion of the latch bar configured to be received through the ring of the buckle when the distal end of the catch of the buckle is disengaged from the ring so that the catch of the buckle may then be rotated through the catch receiving space of the latch bar to engage the ring of the buckle thereby capturing the latch bar to connect the cinch connector to the buckle; and a tongue pivotally connected to the bottom frame member and extendible to the intermediate frame member, the tongue extendible through a hole in the strap to fasten the strap to the cinch connector.

8. The cinch assembly of claim 7 wherein the latch bar has a distal portion defining a first plane and a proximal portion defining a second plane and wherein the first plane is angled with respect to the second plane.

9. A method for securing a saddle to an animal, comprising:

connecting a first end of a cinch to a first side of the saddle, a second end of the cinch having a buckle including a ring and a catch;

looping a strap through a second side of the saddle and a frame defining a strap receiving slot;

passing the cinch beneath the body of the animal;

disengaging a distal end of the catch from the ring of the buckle;

inserting a latch bar connected to the frame member and defining a catch receiving space through the ring of the buckle;

rotating the catch of the buckle through the catch receiving space of the latch bar to engage the ring of the buckle and thereby capture the latch bar to connect the second end of the cinch to the second side of the; and inserting a tongue pivotally connected to the frame through a hole in the strap to fasten the strap to the frame.

10. A method for securing a saddle to an animal, comprising:

connecting a first end of a cinch to a first side of the saddle, a second end of the cinch having a buckle including a ring and a catch;

looping a strap through a second side of the saddle and a frame defining a strap receiving slot:

passing the cinch beneath the body of the animal;

disengaging a distal end of the catch from the ring of the buckle;

inserting a latch bar connected to the frame member and defining a catch receiving space through the ring of the buckle;

rotating the catch of the buckle through the catch receiving space of the latch bar to engage the ring of the buckle and thereby capture the latch bar to connect the second end of the cinch to the second side of the saddle; and passing the strap through a first strap receiving slot and a second strap receiving slot of the frame, the first strap receiving slot defined by a top frame member and an intermediate frame member and the second strap receiving slot defined by the intermediate frame member and a bottom frame member.

11. The method of claim 10 further comprising:

inserting a tongue pivotally connected to the bottom frame member and extendible to the intermediate frame member through a hole in the strap to fasten the strap to the frame.

* * * * *

UNITED STATES PATENT AND TRADEMARK OFFICE
CERTIFICATE OF CORRECTION

PATENT NO. : 7,591,125 B2
APPLICATION NO. : 11/267054
DATED : September 22, 2009
INVENTOR(S) : Herbert R. Horsey It is certified that error appears in the above-identified patent and that said Letters Patent is hereby corrected as shown below:

In the Claims:
Column 6, line 34: After “side of the” insert -- saddle --.

Signed and Sealed this

Tenth Day of November, 2009

David J. Kappos
*Director of the United States Patent and Trademark Office*